United States Patent
Yu

(10) Patent No.: US 10,019,381 B2
(45) Date of Patent: Jul. 10, 2018

(54) CACHE CONTROL TO REDUCE TRANSACTION ROLL BACK

(75) Inventor: Meng-Bing Yu, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 433 days.

(21) Appl. No.: 13/461,458

(22) Filed: May 1, 2012

(65) Prior Publication Data
US 2013/0297876 A1  Nov. 7, 2013

(51) Int. Cl.
G06F 12/02 (2006.01)
G06F 12/122 (2016.01)
G06F 12/126 (2016.01)
G06F 9/46 (2006.01)

(52) U.S. Cl.
CPC .......... G06F 12/122 (2013.01); G06F 12/126 (2013.01); *G06F 9/467* (2013.01)

(58) Field of Classification Search
None
See application file for complete search history.

(56) References Cited

U.S. PATENT DOCUMENTS

| | | | | |
|---|---|---|---|---|
| 5,809,527 A | * | 9/1998 | Cooper | G06F 12/0866 707/999.2 |
| 5,943,687 A | * | 8/1999 | Liedberg | G06F 12/0875 711/133 |
| 6,542,966 B1 | * | 4/2003 | Crawford et al. | 711/133 |
| 6,961,821 B2 | * | 11/2005 | Robinson | 711/133 |
| 2001/0001873 A1 | * | 5/2001 | Wickeraad | G06F 12/121 711/136 |
| 2006/0026360 A1 | * | 2/2006 | Morris et al. | 711/133 |
| 2010/0269102 A1 | * | 10/2010 | Latorre | G06F 9/3842 717/130 |
| 2010/0318741 A1 | | 12/2010 | Scott et al. | |
| 2011/0016276 A1 | * | 1/2011 | Wang | 711/133 |
| 2011/0138126 A1 | * | 6/2011 | Blundell | G06F 9/3004 711/125 |
| 2011/0145505 A1 | * | 6/2011 | Anand | G06F 12/0895 711/130 |
| 2011/0225586 A1 | * | 9/2011 | Bentley et al. | 718/101 |
| 2011/0296148 A1 | * | 12/2011 | Cain, III | G06F 9/30087 712/228 |
| 2012/0124563 A1 | * | 5/2012 | Chung et al. | 717/140 |

FOREIGN PATENT DOCUMENTS

| | | |
|---|---|---|
| CN | 1490730 | 4/2004 |
| TW | 201015579 | 4/2010 |

* cited by examiner

*Primary Examiner* — Charles Rones
*Assistant Examiner* — Ryan Dare

(57) ABSTRACT

In one embodiment, a microprocessor is provided. The microprocessor includes a cache that is controlled by a cache controller. The cache controller is configured to replace cachelines in the cache based on a replacement scheme that prioritizes the replacement of cachelines that are less likely to cause roll back of a transaction of the microprocessor.

19 Claims, 4 Drawing Sheets

| PRIORITY LEVEL FROM HIGHEST TO LOWEST | PRIORITY DESCRIPTION |
|---|---|
| 1 | INVALID CACHELINES |
| 2 | CACHELINES PENDING EVICTION |
| 3 | VALID CACHELINES NOT OWNED BY ANOTHER CACHE |
| 4 | CACHELINES OWNED BY L1 INSTRUCTION CACHE AND NOT OWNED BY L1 DATA CACHE |
| 5 | CACHELINES OWNED BY L1 DATA CACHE |

| PRIORITY LEVEL FROM HIGHEST TO LOWEST | PRIORITY DESCRIPTION |
|---|---|
| 1 | INVALID CACHELINES |
| 2 | CACHELINES PENDING EVICTION |
| 3 | VALID CACHELINES NOT OWNED BY ANOTHER CACHE |
| 4 | CACHELINES OWNED BY L1 INSTRUCTION CACHE AND NOT OWNED BY L1 DATA CACHE |
| 5 | CACHELINES OWNED BY L1 DATA CACHE |

FIG. 2

CACHE CONTROL TO REDUCE TRANSACTION ROLL BACK

BACKGROUND

Microprocessors may employ transaction-based processing where operations (e.g., arithmetic, logical, memory, branch, floating point, etc.) are organized into indivisible sets, referred to as transactions. Each transaction succeeds or fails in being processed by the microprocessor as a complete unit. In other words, the microprocessor ensures that either all operations in a transaction are completed without error, or none of them are completed. If some of the operations are completed but errors occur when the other operations are attempted, the microprocessor "rolls back" all of the operations of the transaction (including the successful ones), thereby erasing all traces of the transaction and restoring the system to a consistent, known state from which the microprocessor began processing the transaction. If all operations of a transaction are completed successfully, the transaction is committed by the microprocessor, all changes are made permanent, and the known state is updated.

Transaction processing guards against hardware and software errors that might leave a transaction partially completed, which may result in an unknown, inconsistent state. For example, if an agent (e.g., a processing core, a direct memory access (DMA) snooping memory controller, an instruction fetch unit, etc.) that is not involved in the transaction attempts to access or modify data that is involved in the transaction, the transaction processing system guarantees that all operations in any uncommitted (i.e., not completely processed) transactions are rolled back, and a consistent state is restored. By tracking a known and consistent state of the microprocessor and rolling back to such a state if a transaction cannot be committed, the integrity of data in the microprocessor can be protected against corruption and operating stability of the microprocessor can be increased.

Although rolling back a transaction protects against data corruption, there are performance penalties associated with roll backs. For example, a penalty of additional operations being processed is paid during recovery from a roll back relative to a successfully committed transaction. In particular, performance penalties may be significant for large or long running transactions.

BRIEF DESCRIPTION OF THE DRAWINGS

FIG. 2 shows an example list of replacement priority levels used to characterize cachelines in a cache.

DETAILED DESCRIPTION

The present discussion sets forth novel systems and methods for controlling a cache of a microprocessor in such a manner that reduces the likelihood of a transaction being rolled back. More particularly, the present discussion relates to a multi-level scheme for replacing cachelines in a cache.

In one example, cachelines are prioritized for replacement based on the likelihood of their replacement causing a transaction to be rolled back. In particular, each cacheline in a cache is assigned a replacement priority level selected from a plurality of replacement priority levels. For example, in an inclusive cache, a cacheline that is duplicated in a lower level cache may be assigned a lower replacement priority level than a cacheline that is invalid, because if the cacheline that is duplicated in the lower level cache were replaced, then the corresponding cacheline in the lower level cache would also have to be replaced. Since such a replacement affects multiple caches, there is a higher likelihood of interfering with an operation that causes roll back of a transaction. In contrast, the invalid cacheline can be replaced without affecting another level of memory. In this example, replacement of the cacheline having the higher replacement priority level would have a lower likelihood of causing rollback of a transaction than replacement of the cacheline having the lower replacement priority level.

In this scheme, a least-recently-used (LRU) cacheline in the cache (or in a cacheline set of the cache in the case of a set-associative cache) having a highest available replacement priority level is selected. Further, the selected least-recently-used cacheline having the highest available replacement priority level is replaced according to a replacement scheme. In one example, a tree-LRU cacheline replacement scheme is employed to replace the selected cacheline in the cache. Note that the highest available replacement priority level denotes that if no cacheline is characterized by the highest replacement priority level in the cache (or a designated cacheline set in the cache), then a LRU cacheline having a next highest replacement priority level is searched for, and so on through the replacement priority levels, until a LRU cacheline having a highest available replacement priority level is selected. By employing a multi-level control scheme that combines selecting a cacheline based on replacement priority level in addition to a primitive replacement approach (e.g., tree-LRU), the likelihood of a transaction being rolled back may be reduced relative to an approach that merely replaces a least-recently-used cacheline. Accordingly, processing performance of the microprocessor may be increased relative to cache control approaches that do not consider transaction roll back penalties when deciding cacheline replacement.

Figure 1:
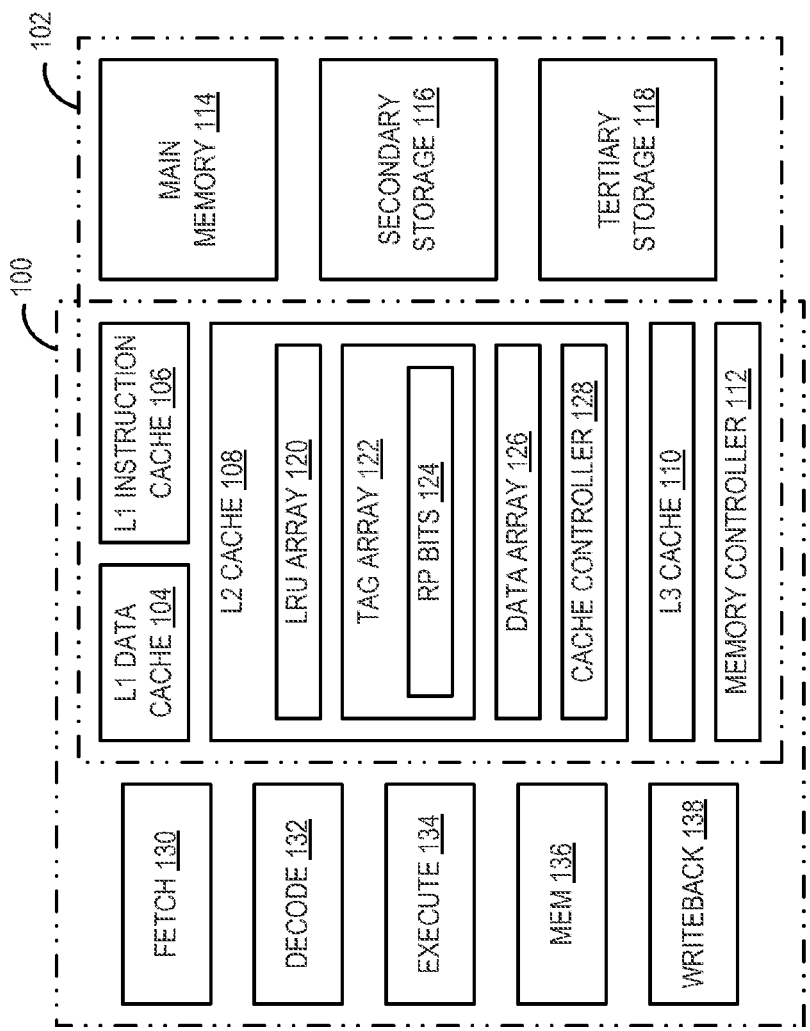
FIG. 1 shows an embodiment of a microprocessor of a computing device according to the present disclosure.

FIG. 1 schematically depicts a microprocessing system 100 that may be employed in connection with the systems and methods described herein. The microprocessor 100 may be a transaction-based microprocessor. The microprocessing system 100 variously includes and/or communicates with a memory hierarchy 102, which includes a level 1 (L1) data cache 104, a L1 instruction cache 106, a level 2 (L2) cache 108, a level 3 (L3) cache 110, main memory 114 (e.g., one or more DRAM chips), secondary storage 116 (e.g., magnetic and/or optical storage units) and/or tertiary storage 118 (e.g., a tape farm). Typically, the L1-L3 caches are implemented on a processor die, and the higher level memory/ storage components are implemented separately off-die. Generally, lower level memory may be smaller and faster and higher level memory may larger and slower. A memory controller 112 handles the protocol and provides the signal interface required of main memory 114 and typically to schedule memory accesses. The memory controller 112 can be implemented on the processor die or on a separate die.

It will be understood that these memory/storage components are listed in increasing order of access time and capacity, though there are possible exceptions. In some embodiments, one or more of these components may be omitted from the microprocessor. It is to be understood that the memory hierarchy provided above is non-limiting and other memory hierarchies may be used without departing from the scope of this disclosure. The depicted memory hierarchy is an exemplary illustration, and it will be understood that other hierarchies may be employed without departing from the spirit of the present disclosure.

In some embodiments, at least some of the different level caches (e.g., L1, L2, L3) may report eviction and/or replacement of a cacheline to at least one other different level cache. In other words, the different level caches do not silently drop a line. In one particular example, the L1 data cache 104 and the L1 instruction cache 106 report eviction and/or replacement of a cacheline to the L2 cache 108. This example configuration may be particularly suitable for the multi-level replacement approach described herein, because the L2 cache 108 may make replacement decisions based on the current contents of the L1 caches.

On the other hand, if the L1 caches were allocating cachelines and not reporting to the L2 cache when they dropped cachelines, eventually every cacheline would be claimed to be owned by the L1 caches. Such cacheline ownership claims would cause all cachelines to be characterized as having the same priority level. If all cachelines have the same replacement priority level, then the multi-level replacement scheme collapses into a standard LRU replacement scheme since all priorities are the same, and the prevention of roll back penalties is reduced.

In some embodiments, at least some of the different level caches are inclusive caches that allocate cachelines for duplication of data from at least one lower level cache. In one example, the L2 cache 108 is a unified cache that is an inclusive cache that allocates cachelines for duplication of data from the L1 data cache 104 and the L1 instruction cache 106. This example configuration may be particularly suitable for the multi-level replacement approach described herein, because the L2 cache 108 may make replacement decisions based on the current contents of the L1 caches.

In some embodiments, the microprocessing system 100 is a pipelined processor that includes fetch logic 130, decode logic 132, execution logic 134, mem logic 136, and writeback logic 138. Fetch logic 130 retrieves instructions from the L1 instruction cache backed by L2-L3 caches and main memory. Decode logic 132 decodes fetched instructions, for example by parsing opcodes, operands, and addressing modes. Upon being parsed, the instructions are then executed by execution logic 134. For operations that produce a result (for example, as opposed to those that perform a branch to another location in the executing program), writeback logic 138 writes the result to an appropriate location, such as a processor register. In load/store architectures, mem logic 136 performs load and store operations, such as loading an operand from main memory into a processor register.

It should be understood that the above five stages are somewhat specific to and included in a typical reduced instruction set computing (RISC) implementation. More generally a microprocessor may include fetch, decode, and execution logic, with mem and write back functionality being carried out by the execution logic. The present disclosure is equally applicable to these and other microprocessor implementations.

Turning specifically to the L2 cache 108, the present discussion focuses on controlling operation of the L2 cache 108, and more particularly, a multi-level replacement scheme for replacing cachelines in the L2 cache 108. The L2 cache 108 includes a memory space that is divided into a plurality of cachelines. In one particular example, each cacheline is sixty four bytes. The L2 cache is a set-associative cache and the cachelines are logically divided into a plurality of cacheline sets. It will be appreciated that the L2 cache may include any suitable number of cacheline sets, each of the cachelines may be any suitable size, and a number of bytes in each cacheline may be different without departing from the scope of the present disclosure.

The number of cachelines in a cacheline set may define the number of locations in the L2 cache 108 to which any particular location in main memory can be mapped. In one example, the L2 cache includes a sixteen-way set-associative array, where each set of cachelines is associative and includes sixteen ways where data can be stored. It will be appreciated that the L2 cache 108 may include any suitable number of ways or data locations in a cacheline set (e.g., two-way, eight-way, fully associative, etc.) without departing from the scope of the present disclosure.

Each cacheline of the L2 cache 108 is divided into different bit fields that provide different information. Specifically each cacheline of the L2 cache 108 includes least-recently-used (LRU) bits, tag bits including replacement priority level bits, and data bits. The LRU bits indicate a least-recently-used (or accessed) way in a cacheline set. The tag bits identify a designated way where an instruction corresponding to the address is stored. The replacement priority bits indicate a replacement priority level that characterizes the cacheline. The data bits store the data for the cacheline.

The different bit fields of each of the cachelines are organized into different arrays that are controlled by a cache controller 128. Specifically, the L2 cache 108 includes a LRU array 120, a tag array 122 including replacement priority bits 124, and a data array 126. The LRU array 120 includes the LRU bits for each cacheline set in the L2 cache 108. The tag array 122 includes the tag bits for each cacheline in the L2 cache 108, as well as the replacement priority bits 124 for each cacheline in the L2 cache 108. The data array 126 includes the data bits for each cacheline in the L2 cache 108.

It will be appreciated that the replacement priority bits 124 may be stored in any suitable field of the cacheline or in a different location without departing from the scope of the present disclosure. Further, note that the different level caches and other memory/data storage components are shown in simplified form and may include alternative or additional elements. For example, the L2 cache may include alternative or additional arrays.

The cache controller 128 is configured to control replacement of cachelines in the L2 cache 108. In one example, the cache controller 128 is configured to assign a replacement priority level selected from a plurality of replacement priority levels to each cacheline in the cache. Further, the cache controller 128 may dynamically update the replacement priority level of a cacheline. For example, a replacement priority level may be updated in a cache index whenever an event occurs that changes the state of the cache. Nonlimiting examples of events that change the state of the cache include a new entry allocation to a cacheline, a read/write request that hits a cacheline, a writeback to a cacheline, an eviction of a cacheline. Note the LRU bits may be updated based on the same type of events as the replacement priority levels.

Although the replacement priority levels are prioritized according to a likelihood of affecting a different level cache, it will be appreciated that in some embodiments the priority levels may be prioritized for a different operating characteristic without departing from the scope of the present disclosure. For example, the replacement priority levels may be directed to optimizing operating speed, power reduction, etc.

The cache controller 128 is configured to select a least-recently-used cacheline of the plurality of cachelines having a highest available replacement priority level in the L2 cache 108. Note that if the L2 cache is a set-associative cache, the cache controller 128 may be configured to select a least-recently-used cacheline having a highest available replacement priority level from a plurality of cachelines in a designated cacheline set of the L2 cache. For example, the designated cacheline set may include a cacheline set that includes tag bits that correspond to an address of data to be stored in the L2 cache. The plurality of replacement priority levels may be prioritized by a likelihood of affecting a lower level cache. In particular, replacement of a cacheline having a higher replacement priority level would have a lower likelihood of affecting a lower level cache and causing rollback of a transaction than replacement of a cacheline having a lower replacement priority level. Note if no cachelines are characterized by a particular replacement priority level, then that replacement priority level may be omitted from the search and the next highest available replacement priority level may be searched for a LRU cacheline.

In one example, the cache controller 128 is configured to search for all cachelines having the highest replacement priority level and selects the least-recently-used cacheline having the highest replacement priority level for replacement. If no cachelines are characterized by the highest replacement priority level, then the cache controller 128 is configured to search for all cachelines having the next highest replacement priority level and selects the least-recently-used cacheline having the next highest replacement priority level for replacement. The cache controller 128 is configured to search the cachelines moving from the highest replacement priority level down until a LRU cacheline having a highest available replacement priority level is found. Further, the cache controller 128 is configured to replace the selected LRU cacheline having the highest available replacement priority level according to a replacement scheme.

It will be appreciated that any suitable cacheline replacement scheme may be employed in cooperation with the replacement priority level selection to form a multi-level control approach without departing from the scope of the present disclosure. In one example, the replacement scheme includes a perfect least-recently-used cacheline replacement scheme. In such an implementation, every time a cacheline is used, the LRU bits for all other cachelines in the cache are updated, and the least-recently-used cacheline in the cache is replaced. In another example, the replacement scheme includes a pseudo least-recently-used cacheline replacement scheme, such as a tree least-recently-used cacheline replacement scheme. Such a scheme may be used for caches with large associativity, because the implementation cost of tracking perfect LRU becomes prohibitive. In such a replacement scheme, fewer bits may be used to track LRU in a cacheline set relative to a perfect LRU replacement scheme. In yet another example, a first-in-first-out (FIFO) cacheline replacement scheme may be utilized to replace a selected cacheline having the highest replacement priority level. In yet another example, a random replacement scheme may be utilized to replace a selected cacheline having the highest replacement priority level.

Note that the multi-level replacement scheme described herein may be applied to any suitable level cache or other memory component to reduce the likelihood of transaction roll backs by a microprocessor without departing from the scope of the present disclosure.

FIG. 2 shows an example list 200 of replacement priority levels used to characterize cachelines in a cache. The list 200 includes five replacement priority levels that are ranked from 1 being highest to 5 being lowest. The plurality of replacement priority levels are prioritized by a likelihood of affecting a lower level cache, where replacement of a cacheline having a higher replacement priority level would have a lower likelihood of affecting the lower level cache and causing rollback of a transaction than replacement of a cacheline having a lower replacement priority level.

The first (1) replacement priority level includes invalid cachelines. The invalid cachelines may include cachelines that are not owned or not being used by any cache or include invalid data that is not useful to any cache. The second (2) replacement priority level includes cachelines that are pending eviction. In one example, each cacheline may include a pending eviction bit in the tag field to indicate whether the cacheline is pending eviction. The third (3) replacement priority level includes valid cachelines that are not owned by another cache. In other words, these cachelines may include valid information, and may be owned by the L2 cache. The fourth (4) replacement priority level includes cachelines owned by the L1 instruction cache 106 and not owned by the L1 data cache. The fifth (5) replacement priority level includes cachelines owned by the L1 data cache 104. As discussed above, the L2 cache may be inclusive, and thus allocates cachelines for duplication of data in the L1 instruction cache and the L1 data cache. These cachelines have lower priority levels, because replacement of these cachelines may affect the state of the L1 instruction cache and the L1 data cache, which may result in the roll back of a transaction.

It will be appreciated that the above described replacement priority levels are merely examples, and more or less replacement priority levels may be employed without departing from the scope of the present disclosure. For example, a load/store unit (not shown) in the writeback logic 138 of the processing pipeline may provide additional information to the L2 cache 108 so that the number of cachelines that may be considered for replacement may be reduced. Such a design may be quicker, but potentially adds complexity to the design of the microprocessor.

Figure 3:
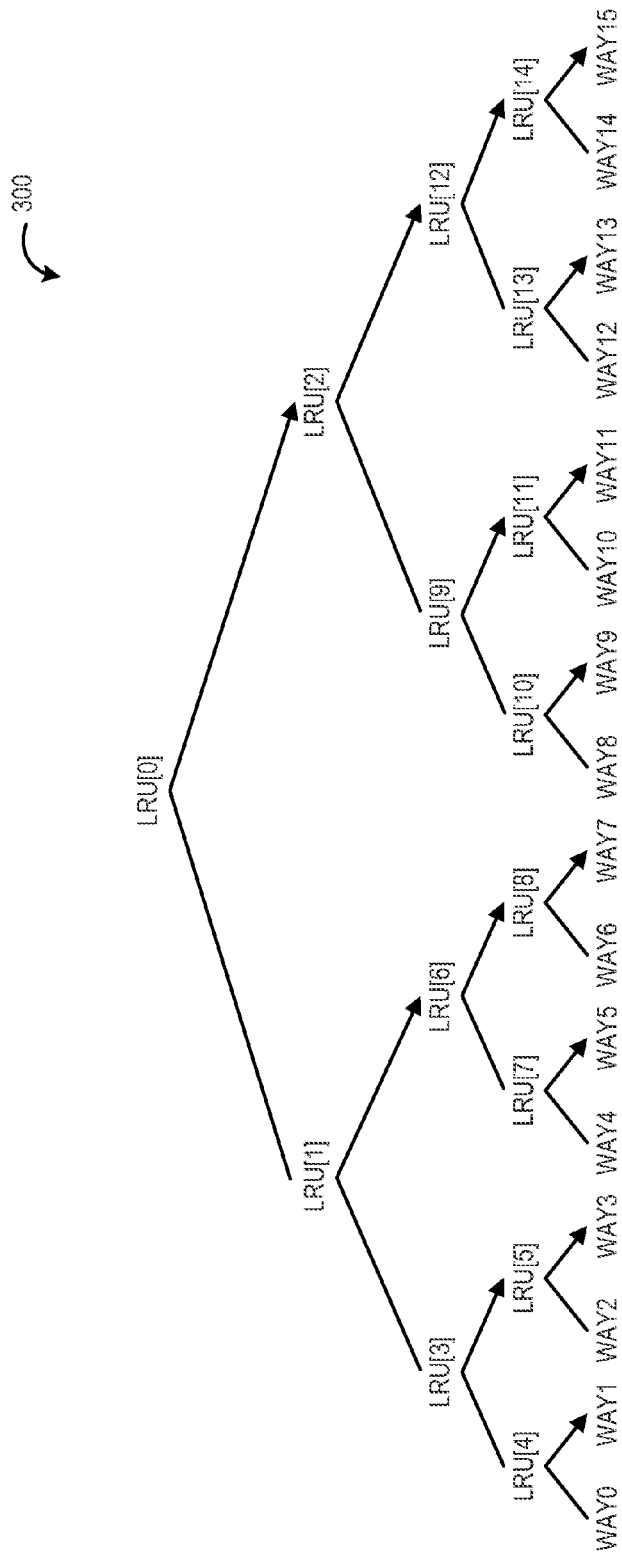
FIG. 3 schematically shows a tree-LRU cacheline replacement scheme used by a cache.

FIG. 3 schematically shows a tree-LRU cacheline replacement scheme 300 that may be employed by the L2 cache as part of the multi-level replacement scheme of the present disclosure. The tree-LRU cacheline replacement scheme 300 is applied to a cacheline set of sixteen cachelines or ways. In one example, the cacheline set is one of a plurality of cacheline sets that make up a sixteen-way set-associative L2 cache. Further, a cacheline set in the cache may be selected as a candidate for cacheline replacement based on the tag bits of cachelines in the cacheline set. The tree-LRU replacement scheme chooses one of the sixteen ways in the cacheline set for replacement. The encoding LRU[14:0] represents the temporal relationship of the sixteen ways in the LRU-tree. Each entry in the encoding may be assigned a value of 0 or 1 to indicate an appropriate temporal relationship of nodes in the tree to determine which ways are least recently used. For example, LRU[4] with the value of 1 indicates WAY1 is least recently used than WAY0, and LRU[4] with the value of 0 indicates WAY0 is least recently used than WAY1.

As discussed above, in the multi-level replacement scheme, for each replacement priority level the LRU-tree may be traversed to select the LRU-way. Then, a highest available replacement priority level LRU way is picked over the lower priority level LRU ways. After the highest replacement priority level LRU way is selected, The LRU[14:0] encoding is updated to reflect the new LRU order. In one particular example, if WAY6 is selected as the LRU way having the highest replacement priority level, then the LRU[14:0] encoding is updated to reflect the change in temporal relationship between the nodes that are associated with WAY6. Specifically, the LRU bits are updated in the following manner: LRU[8]=1, LRU[6]=0, LRU[1]=0, and LRU[0]=1. The rest of the bits in the LRU[14:0] encoding are not changed.

Note that the LRU-tree replacement scheme 300 is merely one example of a replacement scheme that may be used to replace a highest replacement priority level cacheline in a cache as part of a multi-level replacement scheme of the present disclosure. Moreover, any suitable replacement scheme may be used in conjunction with the replacement priority levels without departing from the scope of the present disclosure.

Figure 4:
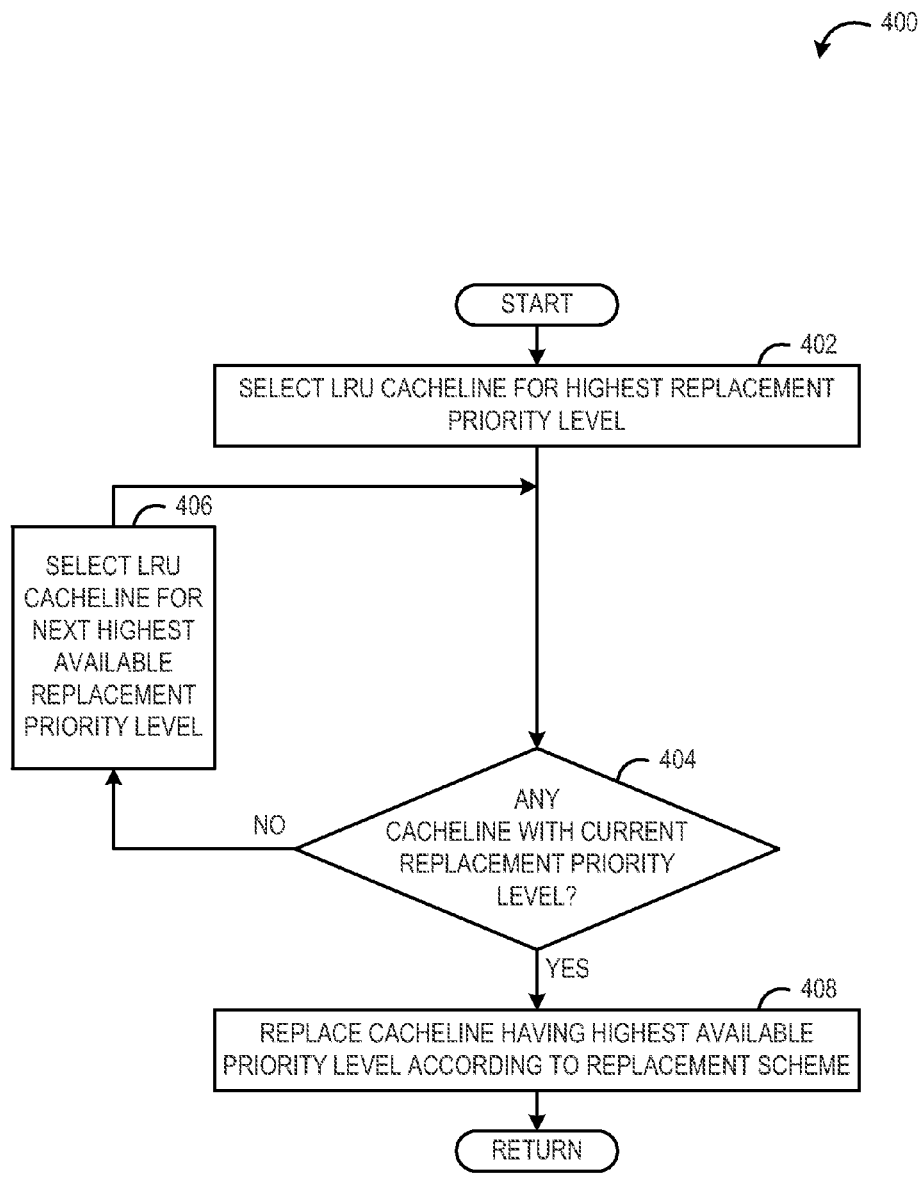
FIG. 4 shows an embodiment of a method for controlling a cache to reduce transaction roll back.

FIG. 4 shows an embodiment of a method 400 for controlling a cache to reduce the likelihood of transaction roll back in a transaction-based microprocessor. The microprocessor may include a plurality of different level caches, and at least some of the different level caches may report eviction and/or replacement of a cacheline to at least one other different level cache. Further, at least some of the different level caches may be inclusive caches that allocate cachelines for duplication of data from at least one lower level cache. In one particular example, the method 400 is performed by the cache controller 128 of the L2 cache 108 of the microprocessing system 100 shown in FIG. 1. In this example, the L2 cache is a unified cache that is an inclusive cache that allocates cachelines for duplication of data from the L1 instruction cache 106 and the L1 data cache 104. Moreover, the L1 instruction cache 106 and the L1 data cache 104 report eviction and/or replacement of a cacheline to the L2 cache 108.

Furthermore, each cacheline in the cache is characterized by a replacement priority level selected from a plurality of replacement priority levels. The plurality of replacement priority levels may be prioritized by a likelihood of affecting a lower level cache. In particular, replacement of a cacheline having a higher replacement priority level has a lower likelihood of affecting the lower level cache and causing rollback of a transaction than replacement of a cacheline having a lower replacement priority level. In one example, the plurality of replacement priority levels include, ranking from a highest priority level to a lowest priority level, (1) invalid cachelines, (2) cachelines that are pending eviction, (3) valid cachelines that are not owned by another cache, (4) cachelines owned by a L1 instruction cache and not owned by the L1 data cache, and (5) cachelines owned by the L1 data cache. In one particular example, each cacheline includes replacement priority level bits that are included with tag bits of the cacheline.

Note, in some cases, the replacement priority level of a cacheline may be dynamically updated based on events that cause a state change of the cache as well as other events.

At 402, the method 400 includes selecting a LRU cacheline having a highest replacement priority level in a cache. In some embodiments (e.g., where the cache is a set-associative cache), the LRU cacheline may be selected from a designated cacheline set of the cache. In some embodiments, the LRU cacheline may be selected from some or all cachelines in the cache.

At 404, the method 400 includes determining whether a LRU cacheline is selected for the highest replacement priority level. If a LRU way was selected for the highest replacement priority level, the method 400 moves to 408. Otherwise, the method 400 moves to 406.

At 406, no cacheline is the cache (or designated cacheline set) was characterized by the highest replacement priority level, and the method 400 includes searching the next highest replacement priority level to select a LRU cacheline for that replacement priority level. The method 400 iteratively searches the replacement priority levels, until a LRU cacheline having a highest available replacement level is selected.

At 408, the method 400 includes replacing the LRU cacheline having the highest available replacement priority level according to a replacement scheme. Replacing may include selecting a higher replacement priority level cacheline for replacement over a lower replacement priority level cacheline even if the lower replacement priority level cacheline is least recently used than the higher replacement priority level cacheline. In other words, the more-recently-used cacheline may be selected over the LRU cacheline because replacement of the more-recently-used cacheline may have a lower likelihood of interfering with completion of a transaction relative to the LRU cacheline. In this way, penalties associated with transaction roll back may be reduced.

Furthermore, the highest replacement priority level cacheline may be replaced using any suitable replacement scheme. For example, the replacement scheme may include one of a perfect least-recently-used cacheline replacement scheme, a tree least-recently-used cacheline replacement scheme, and a first-in-first-out cacheline replacement scheme. In cases where a replacement scheme does not select a LRU cacheline, a cacheline having a higher priority level may be selected for replacement regardless of whether it is least-recently-used in a cacheline set or a cache.

Note that the method 400 may be implemented by any suitable level cache or memory component of a microprocessor without departing from the scope of the present disclosure. It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A microprocessing system comprising:
   a cache comprising:
   a plurality of cachelines each being characterized by a replacement priority level selected from a plurality of replacement priority levels, wherein said replacement priority level denotes a measure of likelihood of replacement of a cacheline causing a transaction to be rolled back, wherein each cacheline includes priority bits that indicate a replacement priority level that characterizes that cacheline, wherein each cacheline is characterized by one of at least three replacement priority levels, wherein replacement of a cacheline having a higher replacement priority level would have a lower likelihood of causing rollback of a transaction than replacement of a cacheline having a lower replacement priority level; and a cache controller configured to (1) select a least-recently-used cacheline of the plurality of cache lines having a highest available replacement priority level, and (2) replace the least-recently-used cacheline having the highest available replacement priority level according to a replacement scheme.

2. The microprocessing system of claim 1, where the replacement scheme includes one of a perfect least-recently-used cacheline replacement scheme, a tree least-recently-used cacheline replacement scheme, and a first-in-first-out cacheline replacement scheme.

3. The microprocessing system of claim 1, where the replacement scheme is a tree least-recently-used cacheline replacement scheme.

4. The microprocessing system of claim 1, where the microprocessor includes a plurality of different level caches, and at least some of the different level caches report eviction and/or replacement of a cache line to at least one other different level cache.

5. The microprocessing system of claim 4, where the at least some of the different level caches are inclusive caches that allocate cachelines for duplication of data from at least one lower level cache.

6. The microprocessing system of claim 4, where the cache is a L2 unified cache that is an inclusive cache that allocates cachelines for duplication of data from a L1 instruction cache and a L1 data cache.

7. The microprocessing system of claim 1, where the microprocessor is a transaction-based microprocessor.

8. The microprocessing system of claim 7, where the plurality of replacement priority levels are prioritized by a likelihood of affecting a lower level cache, where replacement of a cacheline having a higher replacement priority level would have a lower likelihood of affecting the lower level cache and causing rollback of a transaction than replacement of a cacheline having a lower replacement priority level.

9. The microprocessing system of claim 1, where the plurality of replacement priority levels include, ranking from a highest priority level to a lowest priority level, (1) invalid cachelines, (2) cachelines that are pending eviction, (3) valid cachelines that are not owned by another cache, (4) cachelines owned by a L1 instruction cache and not owned by a L1 data cache, and (5) cachelines owned by the L1 data cache.

10. Within a microprocessing system, a method for controlling a cache comprising a plurality of cachelines, each of the plurality of cachelines being characterized by a replacement priority level selected from a plurality of replacement priority levels, wherein said replacement priority level denotes a measure of likelihood of replacement of a cacheline causing a transaction to be rolled back, wherein each cacheline includes priority bits that indicate a replacement priority level that characterizes that cacheline, wherein each cacheline is characterized by one of at least three replacement priority levels, wherein replacement of a cacheline having a higher replacement priority level would have a lower likelihood of causing rollback of a transaction than replacement of a cacheline having a lower replacement priority level, the method comprising:

selecting a least-recently-used cacheline in the cache having a highest available replacement priority level; and replacing the least-recently-used cacheline having the highest available replacement priority level according to a replacement scheme.

11. The method of claim 10, where the replacement scheme is a tree least-recently-used cacheline replacement scheme.

12. The method of claim 10, where the microprocessor includes a plurality of different level caches, and at least some of the different level caches report eviction and/or replacement of a cacheline to at least one other different level cache.

13. The method of claim 12, where the at least some of the different level caches are inclusive caches that allocate cachelines for duplication of data from at least one lower level cache.

14. The method of claim 12, where the cache is a L2 unified cache that is an inclusive cache that allocates cachelines for duplication of data from a LI instruction cache and a LI data cache.

15. The method of claim 10, where the microprocessor is a transaction based microprocessor, and the plurality of replacement priority levels are prioritized by a likelihood of affecting a lower level cache, where replacement of a cacheline having a higher replacement priority level would have a lower likelihood of affecting the lower level cache and causing rollback of a transaction than replacement of a cacheline having a lower replacement priority level.

16. The method of claim 10, where the plurality of replacement priority levels include, ranking from a highest priority level to a lowest priority level, (1) invalid cachelines, (2) cachelines that are pending eviction, (3) valid cachelines that are not owned by another cache, (4) cachelines owned by a LI instruction cache and not owned by a LI data cache, and (5) cachelines owned by the L1 data cache.

17. A microprocessing system comprising:
a LI instruction cache;
a LI data cache;
a unified set-associative L2 cache comprising:
a plurality of cacheline sets comprising a plurality of cachelines, each of the plurality of cachelines being characterized by a replacement priority level selected from a plurality of replacement priority levels, wherein said replacement priority level denotes a measure of likelihood of replacement of a cacheline causing a transaction to be rolled back, wherein each cacheline includes priority bits that indicate a replacement priority level that characterizes that cacheline, wherein each cacheline is characterized by one of at least three replacement priority levels, wherein replacement of a cacheline having a higher replacement priority level would have a lower likelihood of causing rollback of a transaction than replacement of a cacheline having a lower replacement priority level; and a cache controller configured to (1) select a least-recently-used cacheline in a designated cacheline set of the plurality of cacheline sets having a highest available replacement priority level, (2) replace the least-recently-used cacheline having the highest available replacement priority level according to a replacement scheme.

18. The microprocessing system of claim 17, where some of the cachelines are allocated for duplication of data from the L1 instruction cache and the L1 data cache, and the L1 instruction cache and the L1 data cache report eviction and/or replacement of a cacheline to the unified set-associative L2 cache.

19. The microprocessing system of claim 17, where the microprocessor is a transaction-based microprocessor, the plurality of replacement priority levels are prioritized by a likelihood of affecting a lower level cache, where replacement of a cacheline having a higher replacement priority level would have a lower likelihood of affecting the lower level cache and causing rollback of a transaction than replacement of a cacheline having a lower replacement priority level, and the plurality of replacement priority levels include, ranking from a highest priority level to a lowest priority level, (1) invalid cachelines, (2) cachelines that are pending eviction, (3) valid cachelines that are not owned by another cache, (4) cachelines owned by the L1 instruction cache and not owned by the L1 data cache, and (5) cachelines owned by the L1 data cache.

* * * * *